United States Patent [19]

Forman

[11] Patent Number: 5,137,296

[45] Date of Patent: Aug. 11, 1992

[54] POWER OPERATED APPARATUS FOR ADJUSTING THE POSITION OF A BOGIE ON A TRAILER

[76] Inventor: Michael B. Forman, 3659 Russell, St. Louis, Mo. 63110

[21] Appl. No.: 633,108

[22] Filed: Dec. 24, 1990

[51] Int. Cl.$^5$ .............................................. B62D 53/06
[52] U.S. Cl. ............................ 280/407.1; 280/149.2; 180/209
[58] Field of Search ............... 280/405.1, 407.1, 149.2, 280/428, 432; 180/24.02, 209, 906

[56] References Cited

U.S. PATENT DOCUMENTS

| | | | |
|---|---|---|---|
| 2,831,700 | 4/1958 | Sheppard et al. | 280/407.1 X |
| 4,273,347 | 6/1981 | Hulse | 280/149.2 |
| 4,286,797 | 9/1981 | Mekosh, Jr. et al. | 280/149.2 |
| 4,353,565 | 10/1982 | Smith et al. | 280/149.2 |
| 4,635,742 | 1/1987 | Bertolini | 280/149.2 X |
| 4,641,846 | 2/1987 | Ehrhart | 280/149.2 |

FOREIGN PATENT DOCUMENTS 2220394  1/1990  United Kingdom ............. 280/407.1

*Primary Examiner*—Charles A. Marmor
*Assistant Examiner*—Kevin Hurley
*Attorney, Agent, or Firm*—Gravely, Lieder & Woodruff

[57] ABSTRACT

A power operated apparatus for permitting repositioning adjustments of a bogie position in its support of a trailer for enabling changes in the axle loading of the bogie by shifting the bogie forward or rearward on the trailer to meet highway axle loading requirements. The repositioning adjustments are selected through a power hook-up on the trailer and bogie through a system of switches to indicate whether the bogie is securely interlocked on the trailer and whether the bogie brakes are set and the pin connections to the trailer slider are retracted to allow tractor shift of the trailer while the bogie is held stationary by the application of the brakes. The power hook-up includes manual selection of the distance a bogie-trailer shift needs to be made in combination with a system of preselection of the distance in association with bogie brake application and indication of the condition of interlock or release of the pins relative to the trailer slider.

12 Claims, 5 Drawing Sheets

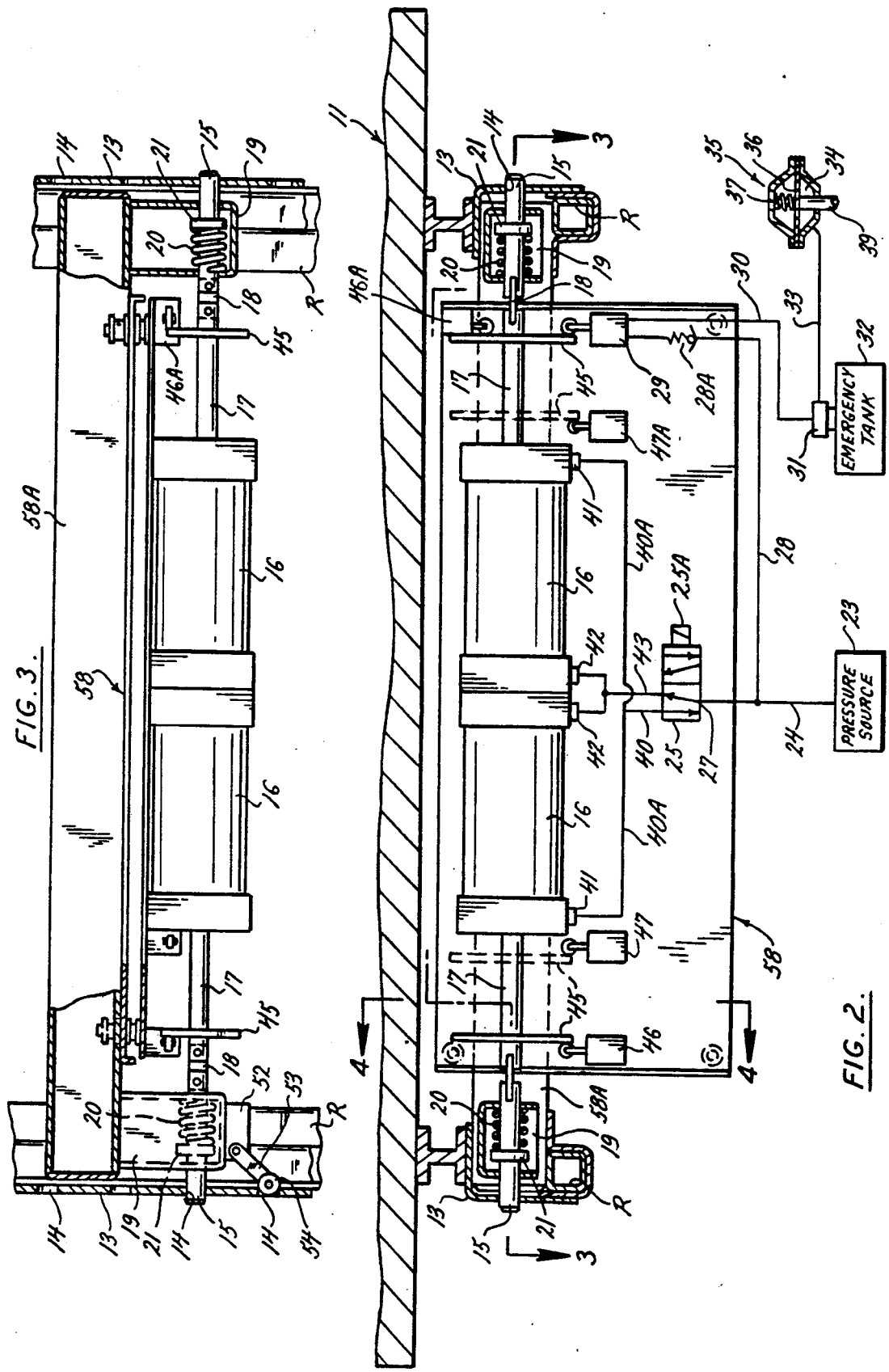

POWER OPERATED APPARATUS FOR ADJUSTING THE POSITION OF A BOGIE ON A TRAILER

BACKGROUND OF THE INVENTION

1. Field of the Invention

This invention relates to apparatus in a tractor trailer combination for connecting and disconnecting a trailer and bogie to obtain a desired wheel loading of the bogie axles and to prevent accidental separation.

2. Description of the Prior Art

It is well understood that the use of the interstate highways by improper axle loading of the tractor-trailers is a significant reason for deterioration of pavement surfaces and why the highways are being repaired almost constantly. One way to alleviate the problem of improper axle loading which contributes to highway damage is to shift the trailer bogie along the body of the trailer to change the axle loading to one that is mandated to be within an axle loading value. Besides creating undue pavement wear, improper axle loading can also cause loss of driver control and jackknifing.

In order to shift a bogie, apparatus has been devised to manually disconnect the bogie from the trailer slider and operate the braking of the bogie so the trailer can be moved in the proper direction to transfer more or less load on the bogie axles. The manual operation is not only time consuming but it requires in most cases the assistance of a helper. Apparatus has been devised for allowing the driver of the tractor to effect a shift in the position of the trailer body relative to the bogie, but problems still remain to effect the locking and unlocking of the bogie in such a way that a secure locking of the bogie in a desired position can be obtained every time a shift is necessary. Other problems are found in the arrangement of the operating mechanism which effects an interlock between a trailer and its bogie. The manual operation for shifting a bogie is often very strenous especially when a trailer is loaded as the friction between the trailer slider and the bogie pin is increased. The pins often stick and must be struck with heavy mallets or sledge hammers by a helper while the driver attempts to rock the trailer as the helper applies manual force on the pin lever mechanism while hammering at the pins. Many injuries have occured to helpers as a result of the physical strain and from falling in the path of the bogie wheels.

If no helper is available, the driver many times can only proceed one slider hole at a time if constant pin retracting force cannot be maintained on the lever which counteracts the spring action which drives the pins into locking positions in the next slider hole that is reached. If the driver overshoots or undershoots the hole the procedure becomes even more time consuming.

There is also a currently existing problem in that a driver can release the brakes and drive the tractor away without the locking pins being inserted into the slider holes. In such cases, the pins are merely being pushed by the retaining springs into the sides of the slider rails so that no secure interlock of trailer and bogie is obtained.

Presently, there is no device being used which would prevent the brakes from releasing until the pins are properly secured. So presently, the trailer can be moved without the pin locking the trailer and bogie together which invites highway accidents when the two separate on the roadway

BRIEF DESCRIPTION OF THE INVENTION

The invention is directed to a power system which indicates relative positions between a trailer and its bogie and the obtaining of a secure interlock thereof.

An important object of the invention is to provide means for permitting the driver of a tractor-trailer to shift the bogie forward or back under the trailer to change the axle loading without assistance in order to change axle loading as required to meet highway regulations as may be encountered in interstate travel trips.

Among the objects of the invention are to provide a unique and inexpensive power system which enables the user to unlock or lock a trailer in relation to its bogie without undue physical strain; to provide means which indicates the need to change the position of the bogie relative to the trailer when the bogie may have been repositioned; and to provide a positive and fail-safe interlock of the trailer and the bogie so that separation of the bogie from the trailer is prevented.

A further object of the invention is to provide a safety feature which will not allow the brakes to be released unless the bogie and trailer are properly interlocked.

Still further an object of the invention is to provide a safety check valve to insure adequate air pressure in the supply system to operate the service brakes.

BRIEF DESCRIPTION OF THE DRAWINGS

The invention can be understood from the drawings which follow, and wherein:

FIG. 2 is a fragmentary sectional elevational view looking rearwardly toward the locking pins and the operative power cylinder for establishing the trailer-to-bogie relationship, the view being taking along line 2—2 in FIG. 1 and including schematically a control system;

FIG. 3 is a fragmentary view looking down at the locking pin apparatus, the view being taken along line 3—3 in certain FIG. 2 to illustrate certain operating components of the system of the invention;

DETAILED DESCRIPTION OF THE EMBODIMENT

Figure 1:
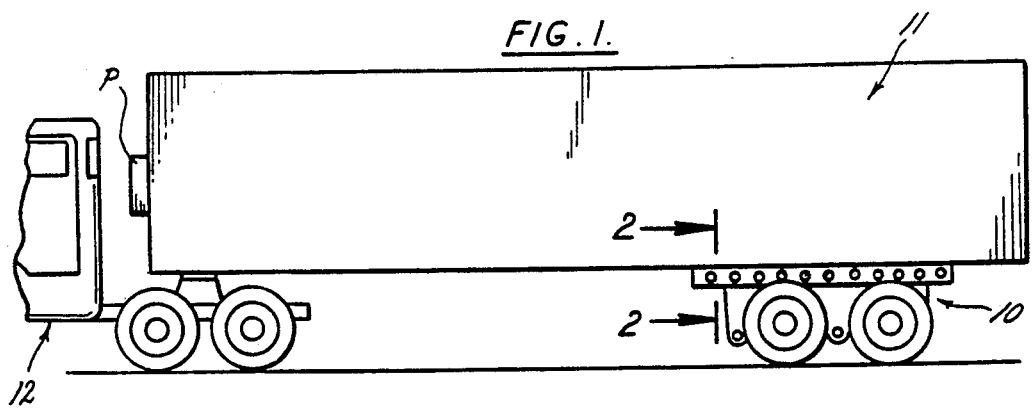
FIG. 1 is a side elevation of a trailer and a fragmentary part of a tractor in which the trailer and its bogie can be equipped with the mechanisms constituting the present embodiments of the invention.

The apparatus of this invention is specially adapted for use in rendering the adjustment of the position of a bogie wheel unit 10 relative to the aft end of a trailer 11 that can be attached to a tractor 12 in the usual manner indicated in FIG. 1. The trailer 11 (FIG. 2) is provided with a pair of slide tracks 13 that are formed with laterally aligned series of holes 14 to receive pins 15 for locking bogie rails R to trailer tracks 13. An important feature of this invention permits the driver of the tractor to make whatever adjustments are necessary to bring the bogie axle loading into proper values through the location of panel P (FIG. 1) on the trailer where control and adjustments can be observed by the driver through the side rear view mirror during the shifting of the trailer relative to the stationary bogie until a predetermined position of trailer and bogie is attained. The driver needs to know which direction the trailer must be moved relative to the bogie and by counting the spacing between the series of holes 14 the desired distance can be estimated. Therefor, by observation of the panel P the movement of the trailer relative to the bogie to the estimated number of holes can be accomplished by setting the brake on the bogie 10 and moving the trailer relative to the bogie by driving the tractor forward or reverse. Reference is now directed in more detail to the drawings.

The Power Operated System

The bogie 10 carries pressure fluid power members 16 which are a pair of cylinders in end-to-end abutment so that piston rods 17 can project from the opposite ends. A single double ended cylinder can also be employed. Each piston rod 17 is connected by a link 18 to a locking pin 15 that is guided in its movement by a housing 19. The housing 19 is intended to enclose a spring 20 which is captured between a shoulder element 21 on the pin 15 and the end wall of the housing 19 so that the spring is under compression tending to move the locking pin 15 outwardly to engage in one of the series of holes 14 in the slides 13 on the trailer 11.

The power operated system for determining the function of the two power cylinder members 16 comprises a source of pressure fluid 23 (which is normally provided) connected by conduit 24 to a pressure inlet port 27 of a suitable operated valve member 25. A branch conduit 28 from conduit 24 connects into the inlet of a valve 29, and the outlet of that valve 29 is connected by conduit 30 into a valve 31 at an emergency fluid pressure tank 32. The conduit 28 has a check valve 28A therein as a safety against loss of pressure fluid. The tank valve 31 is connected by conduit 33 into the air chamber 34 of a brake actuating device 35. The latter device has a diaphragm 36 which separates the air chamber 34 from a spring 37 on the opposite side from the air chamber. The brake actuating device 35 has an operating rod 39 which is connected into the usual brake actuating mechanism (not shown). It is understood that when the force produced by the pressure in the air chamber 34 is greater than the spring force, the rod 39 is actuated to release the wheel brakes so the bogie 10 and trailer 11 can move together.

The valve member 25 in the power operated control system includes a fluid conduit 40 connected by branch conduits 40A into fittings at 41 into the outboard ends of the members 16 and the inboard ends of the members 16 are connected through fittings 42 meeting at a junction with a conduit 43 connects to the solenoid operated valve 25. The position of valve 25 in FIG. 2 directs the pressure fluid to the inboard end fittings 42 of members 16 while the outboard end fittings 41 are opened through conduit 40A and 40 through the valve 25 to the outside. When the valve 25 is actuated by a solenoid 25A in the direction opposite to that shown in FIG. 2, the pressure fluid from source 23 is directed by conduit 40A to the outboard fittings 41 of the members 16 and the return flow is by fittings 42 and conduit 43 at the valve 25 is opened to outside so the locking pins 15 can be withdrawn by rods 17 to unlock the bogie 10 from the trailer slides 13 by compressing the springs 20.

Furthermore, the control system is provided with position indicating means associated with the locking pins 15. In this part of the system, the piston rods 17 are provided with motion responsive means in the form of indicator plate means 45 which are movable with the rods 17 between the full line positions (FIGS. 2 and 3) and the dotted line positions (FIG. 2) to represent the locked and unlocked positions respectively of the pins 15. Plate means 45 activate first means in the form of switches 46 and 46A to indicate the interlocked position of pins 15 and response to the movement of the piston rod members 17. When the members 17 are operated to unlock the bogie by withdrawing the pins 15, the indicator means 45 are moved into the dotted line positions 45 for actuation of other or second means of switch devices 47 and 47A to sense when the pins 15 are fully withdrawn.

Figure 5:
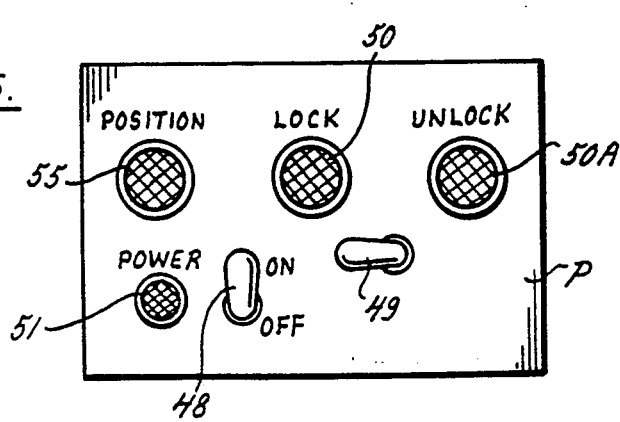
FIG. 5 is a view of a typical control panel for the apparatus seen in FIG. 2.

The command/indicator controllable parts of the mechanism above described is subject to an operator selecting a desired function of locking or unlocking the bogie relative to the trailer. There is provided a panel P (FIG. 5) which is conveniently mounted as a part of a suitable box illustrated on the forward surface of the trailer (FIG. 1) in the view of the tractor operator in his driving position The panel supports a power on-off switch 48 and a lock/unlock switch 49 which is of toggle type so the direction of its inclination will point and correlate to whether the control is to lock or unlock the bogie. In the view of FIG. 5, the switch 49 points to an indicator light 50 which indicates that the status of the bogie and trailer are interlocked. When the power toggle switch 48 is flipped to the power on position (as shown), a light 51 will go on to indicate the electrical circuits are active, and light 50 also will illuminate to indicate that the pins 15 are engaged in an opposite pair of holes 14 in the trailer slides 13, and the trailer and bogie are interlocked for conjoint movement. The lock position light 50 will also be illuminated because the plate means 45 at opposite ends of the double-ended power cylinder 16 have engaged the arms of the first switches 46 and 46A and valve 29. At this time the plate means 45 (at the right hand end of the power cylinder 16) has actuated the valve 29 to supply pressure fluid to the valve 31 at the emergency air tank 32 to feed air to the air chamber 34 of the brake device 35 to release the bogie brakes (not shown). Thus, when the lamp 50 is on the operator knows that the bogie is locked to the trailer and that the bogie brakes are released.

If, at this or some future time, the operator needs to reposition the bogie 10 relative to the trailer 11, either to shift the bogie forward under the trailer to increase the load on the bogie axles, or to shift the bogie 10 farther out towards the rear end of the trailer 11 to decrease the load on the bogie axle, the operator must flip the switch 49 to unlock the bogie 10. This latter action energizes the solenoid 25A at the responsive valve 25. This condition will shift the spool of the valve 25 so the pressure fluid from source 23 is connected to conduits 40 while the conduit 43 is opened through the valve to atmosphere. Thus the locking pins 15 are retracted to positions where the plate means 45 are in the dotted positions (FIG. 2) to illuminate the indicator light 50A at the control panel P. The second switches 47 and 47A are actuated at the same time so the operator knows the bogie is unlocked. Concurrently with the movement of plate means 45 to the dotted position, the valve means 29 will be disengaged so conduit 28 will be closed and pressure fluid cannot flow by way of conduit 30 to brake actuating device 35 and to the emergency tank 32. Hence chamber 34 is not pressurized so the spring 37 presses the brake rod 39 to hold the bogie brakes in the on position to stay locked so the trailer can be repositioned. The panel indicator light 50A will go on to indicate to the operator two things (a) that the trailer is unlocked from the bogie and (b) that the tractor 12 can move the trailer 11 relative to the bogie 10.

Figure 4:
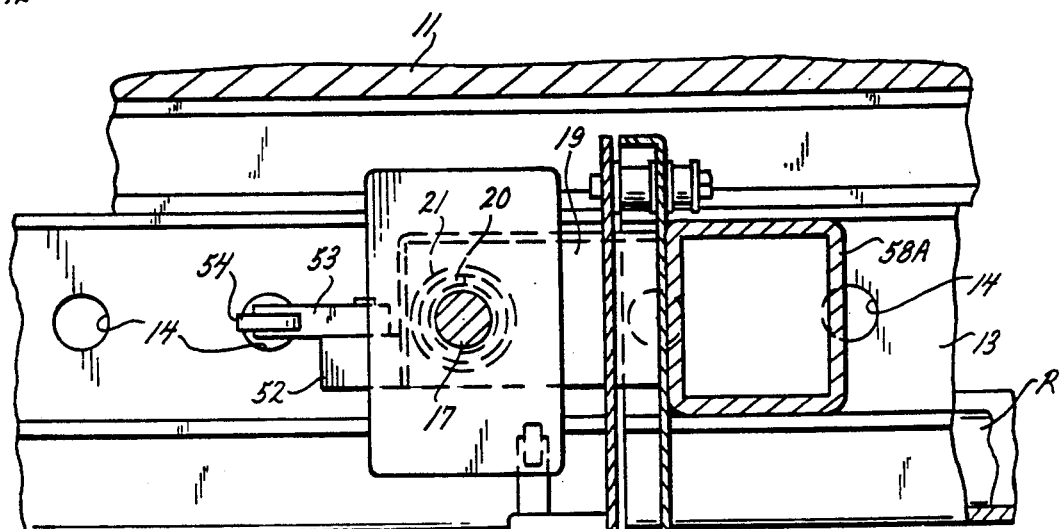
FIG. 4 is a fragmentary assembly view of mechanism for actuating the locking pin position indicator.

Turning now to FIGS. 3 and 4, there is shown an arrangement of a switch 52 positioned on the bogie at a convenient place where an operating arm 53 can press a roller 54 against the slide track 13 to register with the series of holes 14. As the trailer slide track 13 moves, the roller 54 will serve to move the arm 53 to pulse the switch 52 to thereby count the number of holes which will cause a position light 55 on the panel P to blink an equal number of times. By observing the panel P, the operator can move the trailer a predetermined number of holes 14, to reposition the trailer 11 relative to the bogie 10.

The control system which is schematically shown in FIGS. 2,3,4 and 5, without including the wiring harness that is understood to be such that the turning on of the electrical power source at the toggle switch 48 on the control panel P will energize the various circuits between the solenoid 25A and its selection switch 49 to respond for locking or unlocking the trailer and bogie by engaging the pins 15 into the trailer slide holes 14 or retracting the pins 15. Also the power source must be supplied to the switches 46, 46A, 47, 47A and 52 so movement of the respective arms can be interpreted at the control panel P.

Figure 6:
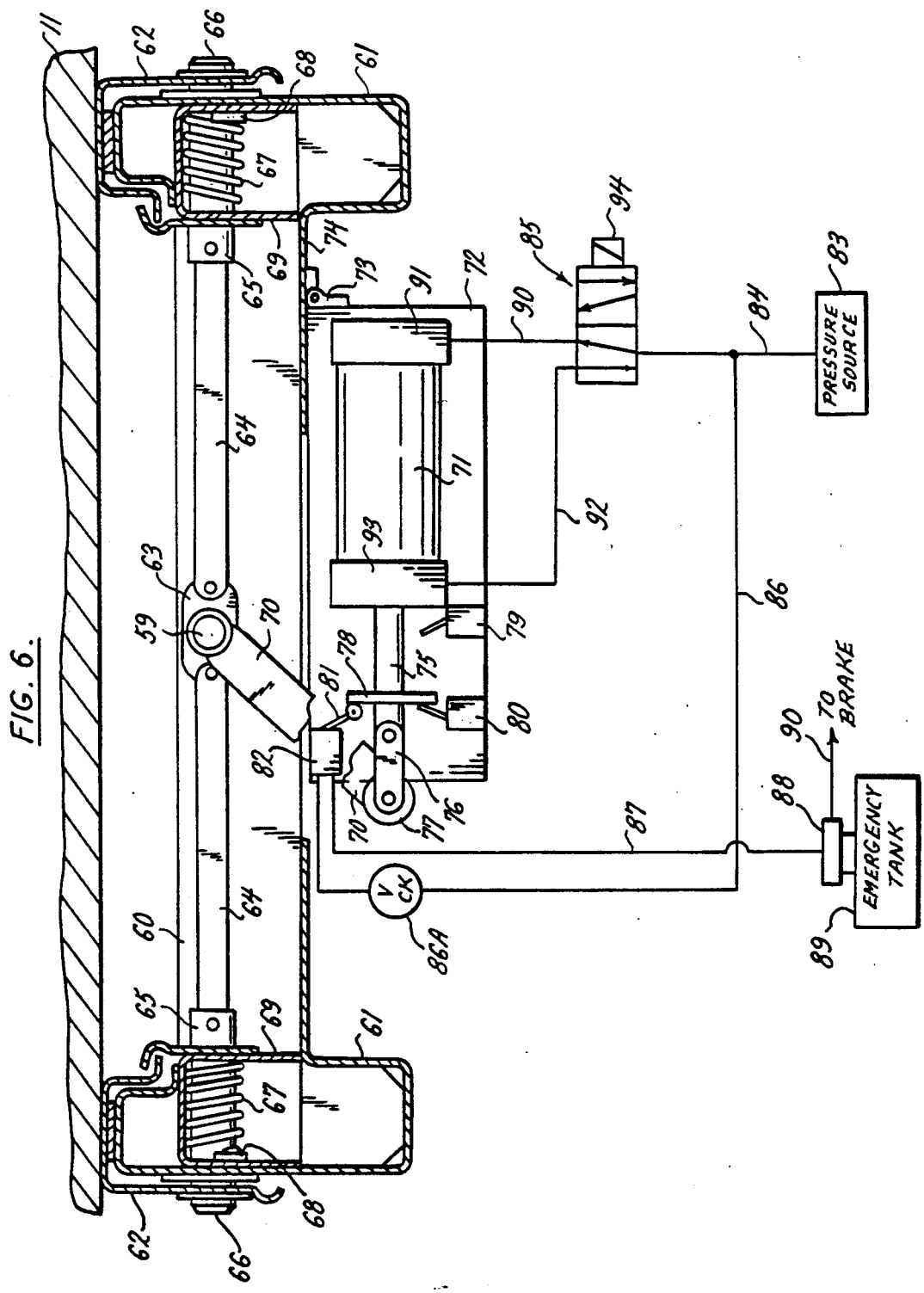
FIG. 6 is a schematic disclosure of a modified multiple locking pin actuating mechanism.

Not all trailer bogies are limited to two pins. In some cases there are more than two locking pins to secure a trailer and bogie in operative positions. Thus it is needed to provide a common actuating shaft to insert or retract four or more pins from the slider holes. Such a provision is seen in FIG. 6 where an initial leading pair of pins is shown associated with a cross beam 60 in the bogie assembly. That beam supports housings 61 at each side of the bogie to cooperate with the trailer carried slider which is a pair of slide tracks 62 so that relative movement may be obtained. The beam 60 supports a longitudinal actuating shaft 59 which extends parallel to housings 61 to support a rotary swivel means 63. Links 64 are pivotally connected to the opposite ends of the swivel means 63 and the outer ends of the links are pivotally connected to the inner ends 65 of the locking pins, whose outer ends 66 are shown engaged in a given pair of holes (not seen) in the slide tracks 62 on the trailer. Each of the housings 61 encloses the intermediate length of the pins 66 so that compression coils springs 67 can abut a stop shoulder 68 on the pins and abut against the housing wall 69. Thus, the compression spring 67 normally force or drive the pins 66 into the given pair of holes to obtain locking positions to retain the trailer and bogie connected.

The locking pins 66 can be withdrawn from the trailer slide tracks 62 by the counterclockwise swinging motion of arm 70 which rotates the shaft 59 and swivel means 63 to pull the links 64 inwardly for unlocking the pins 66. The amount of angular swing of the arm 70 will determine when the pins 66 are withdrawn sufficiently from the given holes in the slide tracks 62, and that can be about ten degrees, more or less. The movement of arm 70 is obtained by mounting a fluid pressure cylinder 71 on a mounting plate 72, which mounting plate 72 is hingedly attached at 73 to the beam 60 where the extension 74 of the adjacent housing 61 is secured to the beam 60. The purpose of hinging the plate 72 is to allow the fluid pressure cylinder 71 to adjust its position as the piston rod 75, with its extension idler link 76, swings the arm 70 about the axis of the shaft 59. In order to move the arm 70 which has a fixed length, the link 76 must pull the arm by its outer end 77 along a circular path, and that means the cylinder 71 must swing downwardly about its hinge 73 to accommodate the angular movement.

Since the plate 72 is allowed to pivot, certain control components must move accordingly. For example, the piston rod 75 carries an abutment element or plate 78 which functions to trip either one of two position switches 79 or 80. In addition, that plate 78 also trips the arm 81 on the fluid pressure valve 82. The switches 79 and 80 are wired into a panel like the panel P in FIG. 5 for lighting up position lamps like lamp 50 and 50A. The switch 79 when tripped illuminates the lamp 50A to indicate an unlocked or pin withdrawn condition. Conversely, switch 80 when tripped (the condition illustrated in FIG. 6) illuminates the lamp 50 to indicate the locked position of trailer and bogie.

Control of the cylinder 71 is similar to the control described in connection with FIG. 2. Thus, the source 83 of pressure fluid (for example air) is connected by conduit 84 to a suitable valve 85, operated by a solenoid 94. Conduit 84 has a branch conduit 86 to the inlet side of the valve 82. There is a check valve 86A in conduit 86 to prevent actuation of the brake mechanism in the event of loss of pressure fluid between source 83 and the check valve 86A. The outlet side of valve 82 is connected by conduit 87 to a valve 88 on the emergency tank 89. The valve 88 at the tank 89 is connected to a brake controller (not shown) like the controller 35 in FIG. 2. The first fluid pressure outlet of the valve 85 is connected by conduit 90 to the base end 91 of the cylinder 71 to extend the piston rod 75, as shown, to lock the pins 66 in the holes in the slider rails 62. A second conduit 92 from the valve 85 extends to the opposite or head end 93 of the cylinder 71, and in this case conduit 92 allows the fluid exhausted from the cylinder 71 to flow through valve 85 to atmosphere. In the position of the piston rod 75 of FIG. 6, the plate 78 has tripped the arm 81 on switch 82 to indicate that the bogie is locked to the trailer and the fluid is vented to atmosphere. At the same time, fluid from conduit 86 flow through valve 82 to conduit 87 and to valve 88. The valve 88 has a conduit 90 that connects into a brake control device like the one shown in FIG. 2. In the locked position, the brake control device releases the bogie brakes so that trailer and bogie are free to be moved.

When it is necessary to lock the brakes on the bogie and unlock the pins 66 so the bogie is held stationary while the trailer is being moved to adjust the axle loading, the solenoid 94 on valve 85 is energized to shift the spool of the valve 85 so pressure fluid is supplied to conduit 92 which directs fluid into cylinder end 93. The result of this is the piston rod 75 is retracted, while the fluid in the cylinder 71 is exhausted from the base end 91 and through conduit 90 at valve 85 to escape to atmosphere. When this happens the abutment plate 78 trips switch 79 and that action indicates at the control panel P that the bogie is unlocked because the unlock lamp 50A is lit.

The mechanism seen in FIG. 6 is suitable for a bogie that has more than one pair of locking pins and the rotary shaft 59 can be employed to operate a second set of links and associated pins, all operated by the cylinder 71.

While the piston member 71 is shown in a position in FIG. 6 where the piston rod 75 is exposed when the pins 66 are interlocked with the trailer slides 62, it may be more desireable to relocated the piston 71 and its operating components 79, 80, 81 and 82 by directing the piston rod 75 so it is retracted in the cyliner to retain the lever 70 in the same position. This change can be accomplished by flipping the piston 180°. Of course, the fluid conduits will have to be relocated in order to retain the operation of the system as previously described.

Moreover, by providing duplicate switches 46,46A,47,47A, and 79,80 in association with the power member 16 or 71, there is achieved information that switches have been actuated to convey the proper message to the drive of the tractor that both locking pins 15 or 66 have been responsive. The power source can be a 12 volt battery on board the trailer and connected by a suitable wiring harness to the switches on the bogie. In this manner, each trailer carried battery source and the panel P can be provided with a detachable hook-up into the wiring harness of any one of several bogies equipped to properly match the control panel P on the trailer. This method makes the system disclosed herein substantially universal in the field of interchangeable tractor-trailer combinations.

Figure 7:
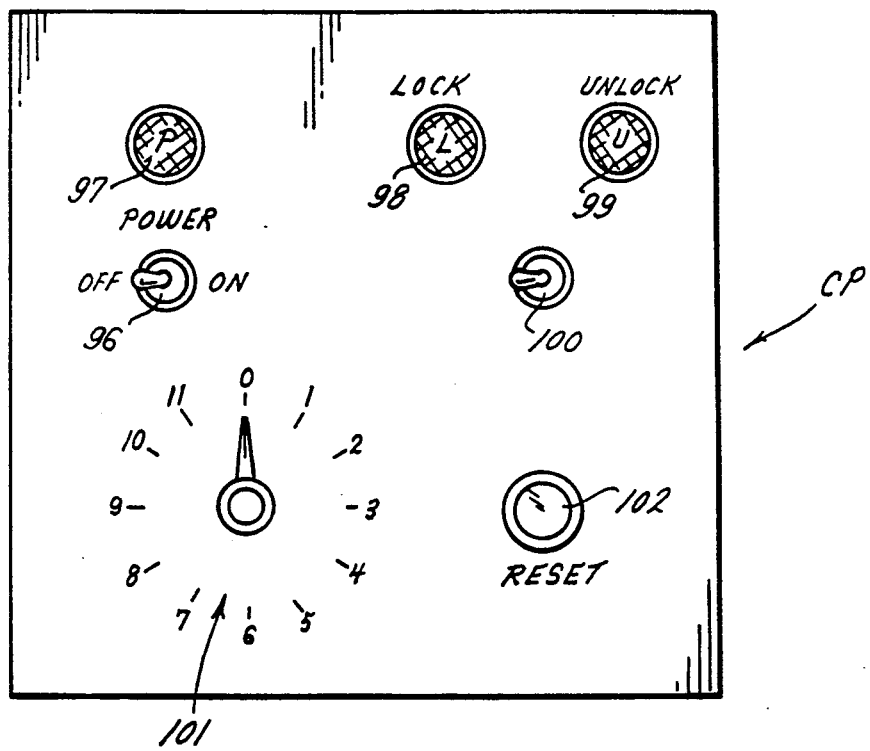
FIG. 7 is a face view of a control panel for a resettable control system.
Figure 9:
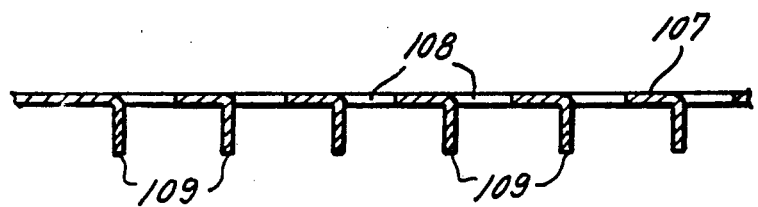
FIG. 9 is a modificed indicator strip which is the equivalent of a series of holes in a trailer slider.
Figure 8:
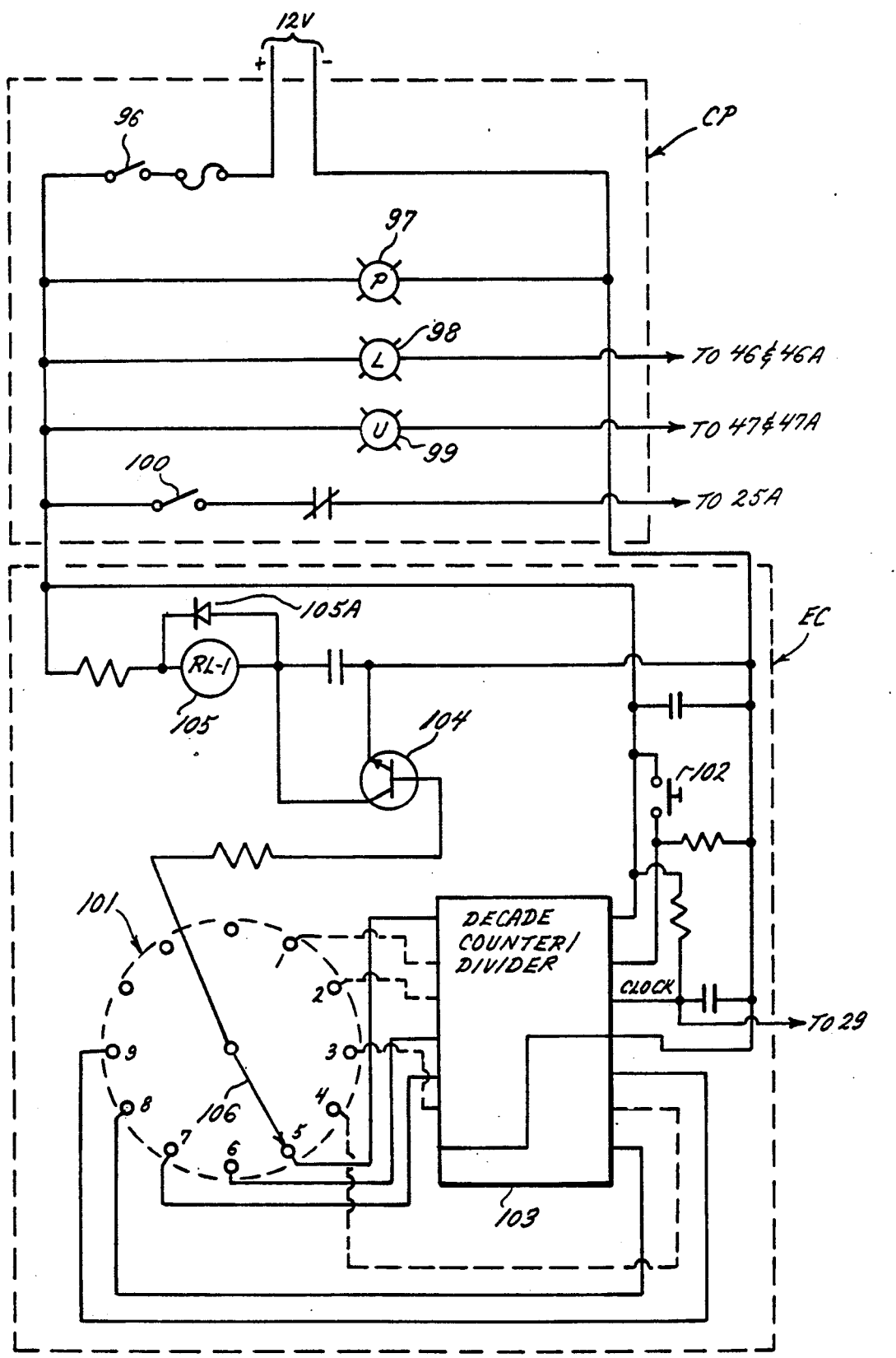
FIG. 8 is a schematic diagram of an electronic circuit employed in conjunction with the control system seen in FIG. 7.

A further embodiment of the invention is shown in FIGS. 7, 8 and 9 which is unique in that it discloses a presettable control system that is more comprehensive than the system of FIGS. 2 and 5. The user of the control system of FIGS. 7 and 8 relieves the operator of the need to operate the lock/unlock switch 49 in FIG. 5 to lock the position of the bogie. When the desired axle position is reached, there are sensors to indicate the predetermined position so the suitable valve 25 will be automatically deenergized and the locking pins 15 will automatically interlock the bogie 10 with the trailer 11.

There is in this unique embodiment a control panel CP in association with an electronic circuit EC, both of which can be mounted in a suitable box (not shown) in which the cover of the box can serve as the control panel CP. This arrangement is desirable because connectors and lengthy multiconductor control cables will not be needed to effect a substantial decrease in parts and installation costs.

The control panel CP (FIG. 7) supports a power on/off switch 96, a power on indicator light 97, a lock indicator light 98, an unlock indicator light 99, a lock-/unlock switch 100, a rotary switch 101, and a reset push button switch 102. The major components in the electronic circuit EC of FIG. 8 include a decade counter/divider 103, a switching transistor 104, and a relay 105. The remainer of the circuit will be recognized as made up of various resistors, capacitors, and a diode 105A connected to each other and interconnected with the control panel CP.

The wiring connections are such that they make up an electronic module to provide all necessary requirements to command the power device to interlock the bogie 10 with the trailer 11 at any desired axle loading position. Since the operation of the power device is the same as previously described, it is necessary to explain only the operation of the presettable control features seen in FIGS. 7 and 8.

When the Bogie 10 must be repositioned relative to the trailer 11, the operator turns on the power switch 96 and the lights 97 and 98 will be illuminated which indicates that the power is on and the Bogie 10 is interlocked with trailer 11. Next he turns the rotary switch 101 to a number which represents the number of holes 14 in the trailer slide 13 to where the pins 15 are desired to be repositioned. If it is assumed that the Bogie 10 is to be shifted five holes 14, the switch 101 is turned to position 5 and then the reset switch 102 must be pushed to reset the decade counter devider 103 to zero. Now the operator turns the lock/unlock switch 100 to unlock position. Thereby energizing the solenoid at valve 25 which causes the pins 15 to withdraw from holes 14. The motion of means 45 to the dotted line position will close valve 29 and the brakes on the bogie will be set. Now the Bogie 10 is disengaged from trailer 11 and can be repositioned. As the trailer 11 moves relative to the stationary Bogie 10, the arm 53 of switch 52 (FIG. 4) will move out from the hole 14 in which it was prior to the movement of the trailer 11. (Original relative position of Bogie and Trailer). At that instant the normally closed contact of switch 52 will become open. This condition will cause the clock of the decade counter/divider 103 to go high and it will count 1. The same action will occur as the arm 53 pulses the switch 52 on passing each hole 14. Therefore, after the arm 53 moves out from the 4th hole 14 the clock of the decade counter/divider 103 will count 5. At this instant, the position 5 of the rotary switch 101 will supply 12 V.DC to the decade counter/divider 103 through its collector arm 106 and the base of the transistor 104 will go high. Now the relay 105 is energized through the transistor 104, its normally closed contacts will open and the solenoid at valve 25 becomes de-energized. This action of valve 25 automatically causes the piston rods 17 to move outwardly and the piston rods 17 will push pins 15 through the next holes 14 which holes 14 will be the desired 5th holes where the Bogie 10 is desired to be again interlocked with trailer 11. Now the operator turns switch 100 to the lock position and the power switch 96 to the off position to complete the Bogie shift.

FIG. 9 is a metallic strip 107 having a series of holes 108 formed therein by lancing the strip at the sides to form a series of tabs 109 which can be bent into extended positions for ease of counting. The strip 107 can be secured to the trailer 11 to precisely represent the holes 14 in the slide 13. The spacing of the protrusion 109 needs to be the same as the spacing of the holes 14 so the counting by the arm 53 (FIG. 4) of the switch 52 will be the same as before. The protrusions instead of being bent tabs 109 may have any convenient shape, such as bumps or knobs that function sufficiently to actuate the counter roller 54 of FIG. 4. Also, the protrusions may be magnetic to actuate a magnetic roller 54 on the arm.

In the embodiment of FIGS. 7, 8 and 9, the box containing the control panel CP and the electronic circuits EC can be located either at the forward end of the trailer 11, or it may be placed close to the bogie 10 where the driver of the tractor 12 can check the result of the shift between the trailer and its bogie. The uniqueness of the control system seen in FIGS. 7 and 8 lies in the ability of a driver to manually preset the desired number of slider holes on the trailer when making a trailer shift relative to the bogie. At the final count, the brakes on the bogie will automatically lock the required number of holes switch 101. The direction of the shaft is determined by the driver to obtain the axle loading needed.

It is recognized that the mechanism seen in FIGS. 2, 3, 4, 6 and 9 may be protected by suitable covers or housings to prevent dirt, ice and road contaminants getting into the moving parts to foul up the operation thereof and thereby predjudice the accuracy of any axle loading changes which may become necessary. All such covers or housings have been omitted so the operating mechanism can be better shown.

The foregoing specification has set forth certain embodiments of the control system that represent preferred systems, but it is recognized that modification ban be thought of without departing from the scope of the invention.

What is claimed is:

1. A power operated system for locking and unlocking relatively moveable trailer and bogie members supported on wheels, the members comprising:
   (a) a pair of trailer mounted slides, each formed with a series of holes in which the holes in one slide are directly opposite holes in the other slide to at lest form pairs of aligned holes;
   (b) a pair of bogie mounted guide rails for receiving said trailer mounted slides to guide the relative movement between said trailer and bogie;
   (c) fluid pressure responsive power means mounted on said bogie and oriented to extend between said guide rails on said bogie;
   (d) pin means operably carried on said bogie in position to be moved by said power means into locking and unlocking positions with any selected pair of aligned holes in said trailer mounted slides for in one position effectively locking said trailer slides and bogie guide rails for conjoint movement and for in another position effecting the unlocking of said bogie from said trailer;
   (e) a source of pressure fluid operably connected to said power means for selectively moving said pins means into locking or unlocking position with the selected pair of aligned holes of said slides;
   (f) a wheel brake operating system for selectively applying a braking force on the bogie wheels or for release of a brake force on said bogie wheel;
   (g) means for preventing brake release until said pins are fully inserted into slide holes for proper bogie and trailer interlock to avoid separation thereof; and
   (h) control means for initiating the operation of said power means and pin means for initiating the operation of said power means and for selecting the direction of movement of said pin means, including pressure fluid flow means connected between said source of pressure fluid and said wheel brake operating system to be activated concurrently with fluid pressure flow to said power means, a valve means in said pressure fluid flow means in a position to be activated by sad motion responsive means operated by said power means to release pressure fluid flow into said wheel brake operating system to effect release of a brake force on said bogie wheel.

2. The power operated apparatus set forth in claim 1 wherein said control means includes means in response to the relative movement between said slides and said rails, and means operably carried by at least one of said bogie guide rails to enable the counting of the number of holes moving past the location of said pin means carried by said bogie in order to determine the linear amount of movement between said holes on said slides on the trailer and said pin means on said bogie, and a position indicating light carried by said control means for blinking said light to count the passage of holes.

3. A power operated system for connecting and disconnecting a bogie and a trailer for effecting a shift of the bogie relative to the trailer comprising:
   (a) a bogie having wheels for at least partially supporting a trailer, and fluid pressure operated pin means on said bogie in position to selectively connect and disconnect said bogie to the trailer;
   (b) slider means on the trailer to permit shifting said bogie;
   (c) a system of pressure fluid carried by said bogie and connected into said fluid pressure operated pin means;
   (d) pressure fluid flow control valve means on said bogie connected to direct pressure fluid flow into said system of pressure fluid to selectively operate said pin means to connect and disconnect said bogie, and brake means responsive to operation of said pin means; and
   (e) a control assembly operably connected to said trailer and bogie to enable shifting the positioning of said bogie relative to said trailer for obtaining a predetermined desired bogie wheel loading in support of said trailer, said control assembly including a power on/off switch for said control assembly, a switch for selecting the operating of the pin means connection between the bogie and trailer, counting means responsive to the positional shift movement of the bogie relative to the trailer, and an electric circuit interconnecting the respective switchmeans associated with the control assembly whereby the power switch in the on position activates the electric circuit to energize the control assembly.

4. The apparatus set forth in claim 3 wherein said counting means is responsive to bogie shift in the position of said bogie said counting means comprises a series of elements on said trailer in predetermined spaced relation longitudinally of said trailer and means on said bogie is positioned to be moved physically by said elements for counting the number of elements of said series corresponding to a desired bogie shifted position.

5. The apparatus set forth in claim 3 wherein said control assembly includes manually presettable means to select a desired shift position between said bogie and trailer for thereafter directing the eventual interlocking of the same when the desired position is reached.

6. The apparatus set forth in claim 5 wherein said manually operated means to select the shift of the bogie is independent of the direction of the shift of the bogie relative to said trailer.

7. A power operated system in a tractor-trailer combination for permitting shifting the position of a trailer relative to its support by a wheeled bogie, the system comprising:
   (a) slider rails on the trailer;
   (b) guide means on the bogie to receive said slider rails to establish the trailer support on the bogie;
   c) fluid pressure operated means on said bogie selectively operable to in a first position effect a connection of said guide means with said rails for conjoint movement of the trailer and bogie, and in a second position to effect a disconnection of said guide means from said rails to enable shifting the position of the trailer relative to the bogie;

(d) brake means operative to retain the bogie in said second position during shifting of the bogie relative to said trailer;

(e) control means associated with said fluid pressure operated means and said brake means, said control means being responsive for effecting the selective operation of said fluid pressure operated means to disconnect said guide means from said rails and substantially simultaneously to effect engaging said brake means for fixing the bogie position for permitting shifting the trailer relative to the bogie; and (f) means supporting said control means on said trailer in the view of the tractor.

8. A power operated system as set forth in claim 7 where said fluid pressure operated means includes piston means having fluid parts, a source of pressure fluid on the bogie, a controllable valve connected in a pressure fluid circuit between said source of pressure fluid and said fluid parts, a fluid circuit from said pressure source to said brake means, a valve in said last mentioned fluid circuit, means subject to operation of said piston means in a direction to effect connection of said guide means with said rail, and a one way flow check means in said last mentioned fluid circuit to arrest loss of pressure fluid at said brake means.

9. Apparatus for adjusting the position of a wheeled bogie under a trailer supported thereby in which the bogie and trailer are relatively slideably moveable with pin means on the bogie for interlocking the bogie with the trailer for conjoint movement and brake means for restraining the bogie against movement when adjusting the position of the trailer relative to the bogie characterized by:

a) reversible means on the bogie in position to operate the pin means into and out of interlocking relation with the trailer;

b) brake actuating means on the bogie;

c) a source of pressure fluid having a first connection with said reversible means and a second connection with said brake actuating means; and d) control means arranged between the trailer and bogie for connection with said first and second pressure fluid connections to operate said pin operating means and said brake means to cause said reversible means on the bogie to move said pin means selectively into and out of interlocking relation with the trailer, and means on the bogie responsive to movement of the pin operating means to cause brake actuation for restraining the bogie against movement upon withdrawl of the pin means to release the trailer and bogie from an interlocked relation including means to preselect a position of adjustment of the trailer on the bogie, and for automatically reestablishing interlocking relation of the trailer and bogie following attainment of the preselected position of adjustment.

10. Apparatus as characterized in claim 9 wherein said control means includes safety means in said second connection of said pressure fluid with said brake actuating means operable to check loss of pressure fluid.

11. Apparatus as characterized in claim 9 wherein said control means includes means responsive to actuation of said reversible means for sensing the interlocked relation of said bogie and trailer.

12. Apparatus as characterized in claim 9 wherein said control means is operated to prevent release of said brake means before said pin means has moved into interlocking relation with the trailer.

* * * * *

UNITED STATES PATENT AND TRADEMARK OFFICE
CERTIFICATE OF CORRECTION

PATENT NO.　：　5,137,296

DATED　　　：　August 11, 1992

INVENTOR(S)：　Michael B. Forman and James W. Vishion

It is certified that error appears in the above-identified patent and that said Letters Patent is hereby corrected as shown below:

Col. 9, line 25 in part (a) of claim 1
    "lest" should be "least"

Col. 9, line 52 in part (h) of claim 3
    delete "for initiating the operation of" and
    insert "operatively associated with"

Col. 9, line 55 in part (h) of claim 1
    after "means" and before "including"
    insert "said control means"

Col. 9, line 61 in part (h) of claim 1
    "sad" should be "said"

Col. 10, line 33 in part (e) of claim 3
    "operating" should be "operation"

On the title page, item [76] Inventor: please add --James W. Vishion, Webster Grove, Mo.-- as co-inventor.

Signed and Sealed this

Twentieth Day of October, 1992

Attest:

DOUGLAS B. COMER

Attesting Officer

Acting Commissioner of Patents and Trademarks